US012621440B2

(12) United States Patent (10) Patent No.: US 12,621,440 B2
Kawakami (45) Date of Patent: May 5, 2026

(54) ENCODING APPARATUS, IMAGE CAPTURING APPARATUS, CONTROL METHOD, AND STORAGE MEDIUM

(71) Applicant: CANON KABUSHIKI KAISHA, Tokyo (JP)

(72) Inventor: Masashi Kawakami, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 90 days.

(21) Appl. No.: 18/588,255

(22) Filed: Feb. 27, 2024

(65) Prior Publication Data

US 2024/0323364 A1     Sep. 26, 2024

(30) Foreign Application Priority Data

Mar. 22, 2023     (JP) ................................. 2023-045786

(51) Int. Cl.
| | |
|---|---|
| *H04N 19/11* | (2014.01) |
| *H04N 19/105* | (2014.01) |
| *H04N 19/136* | (2014.01) |
| *H04N 19/176* | (2014.01) |
| *H04N 19/182* | (2014.01) |
| *H04N 19/593* | (2014.01) |

(52) U.S. Cl.
CPC ........... *H04N 19/11* (2014.11); *H04N 19/105* (2014.11); *H04N 19/136* (2014.11); *H04N 19/176* (2014.11); *H04N 19/182* (2014.11); *H04N 19/593* (2014.11)

(58) Field of Classification Search
None
See application file for complete search history.

(56) References Cited

U.S. PATENT DOCUMENTS

| | | | |
|---|---|---|---|
| 10,742,980 B2 | 8/2020 | Kaneko | |
| 11,503,296 B2 | 11/2022 | Kaneko | |
| 2004/0032987 A1* | 2/2004 | Lee ........................ | H04N 19/53 |
| | | | 375/E7.122 |

(Continued)

FOREIGN PATENT DOCUMENTS

WO     WO-2004104930 A2 *  12/2004    ........... H04N 19/124

OTHER PUBLICATIONS

"Series H: Audiovisual and Multimedia Systems Infrastructure of audiovisual services—Coding of moving video," High efficiency video coding, Recommendation ITU-T H.265, Jun. 2019.

*Primary Examiner* — Chikaodili E Anyikire
(74) *Attorney, Agent, or Firm* — Venable LLP

(57)     ABSTRACT

There is provided an encoding apparatus. A determination unit determines whether a degree of flatness of pixel values in a first block among a plurality of blocks that compose an image exceeds a predetermined criterion. A selection unit executes processing for selection of an intra prediction mode for the first block. In a case where it has been determined that the degree of flatness in the first block exceeds the predetermined criterion, a control unit controls the processing for selection so as to increase a possibility that the intra prediction mode for the first block is different from each of one or more intra prediction modes for respective one or more reference blocks. An encoding unit applies intra predictive encoding to the first block in accordance with the intra prediction mode selected through the processing for selection.

9 Claims, 8 Drawing Sheets

(56)        References Cited

U.S. PATENT DOCUMENTS

| | | | |
|---|---|---|---|
| 2010/0020872 A1* | 1/2010 | Shimizu ............... | H04N 19/196 |
| | | | 375/E7.243 |
| 2011/0002385 A1* | 1/2011 | Kobayashi ............. | H04N 19/14 |
| | | | 375/E7.243 |
| 2016/0173906 A1* | 6/2016 | Lei ....................... | H04N 19/176 |
| | | | 375/240.13 |
| 2019/0268597 A1* | 8/2019 | Nagumo .............. | H04N 19/157 |
| 2020/0099926 A1* | 3/2020 | Tanner ................... | H04N 19/97 |

* cited by examiner

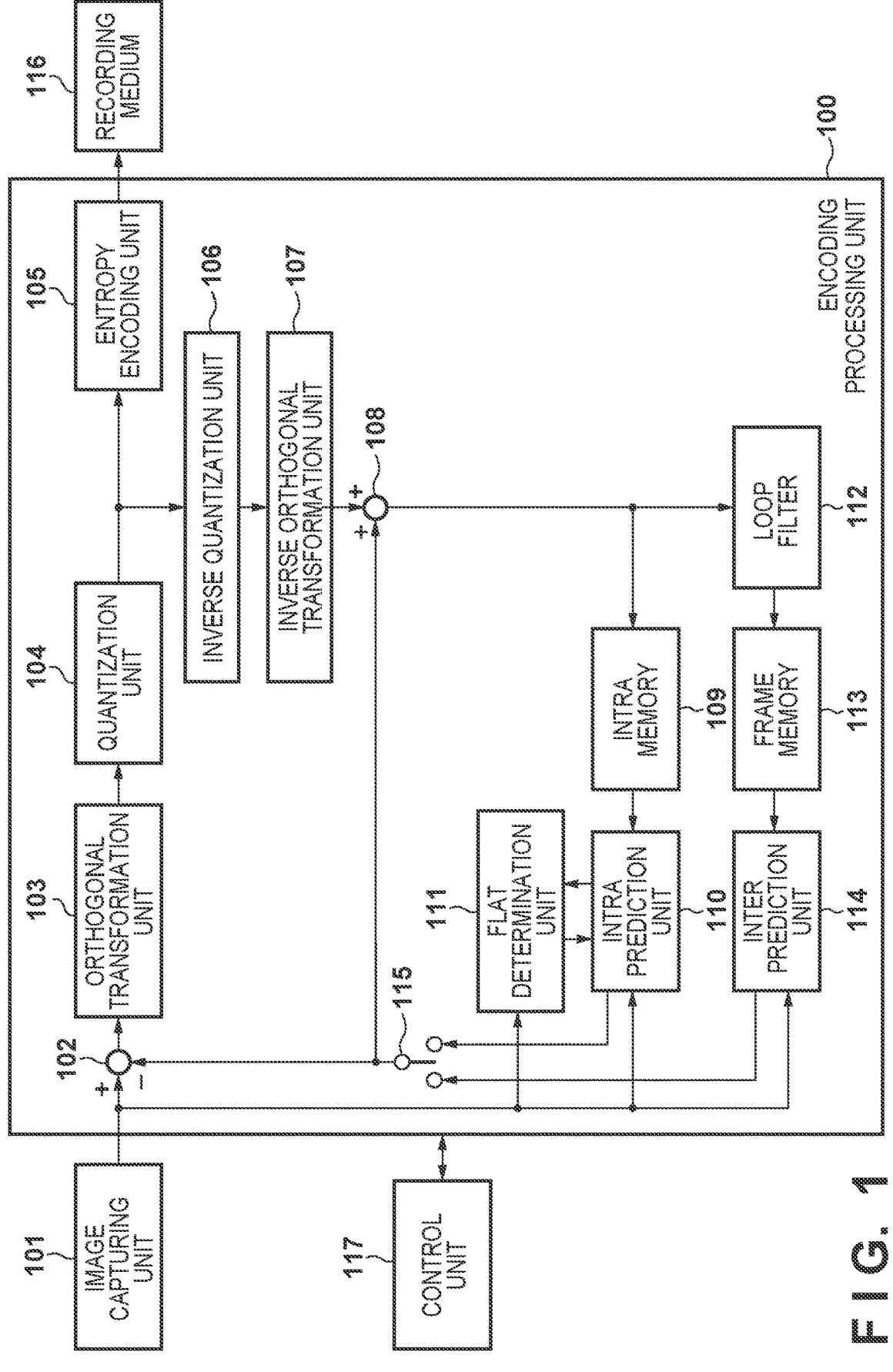
F I G. 1

F I G. 2A
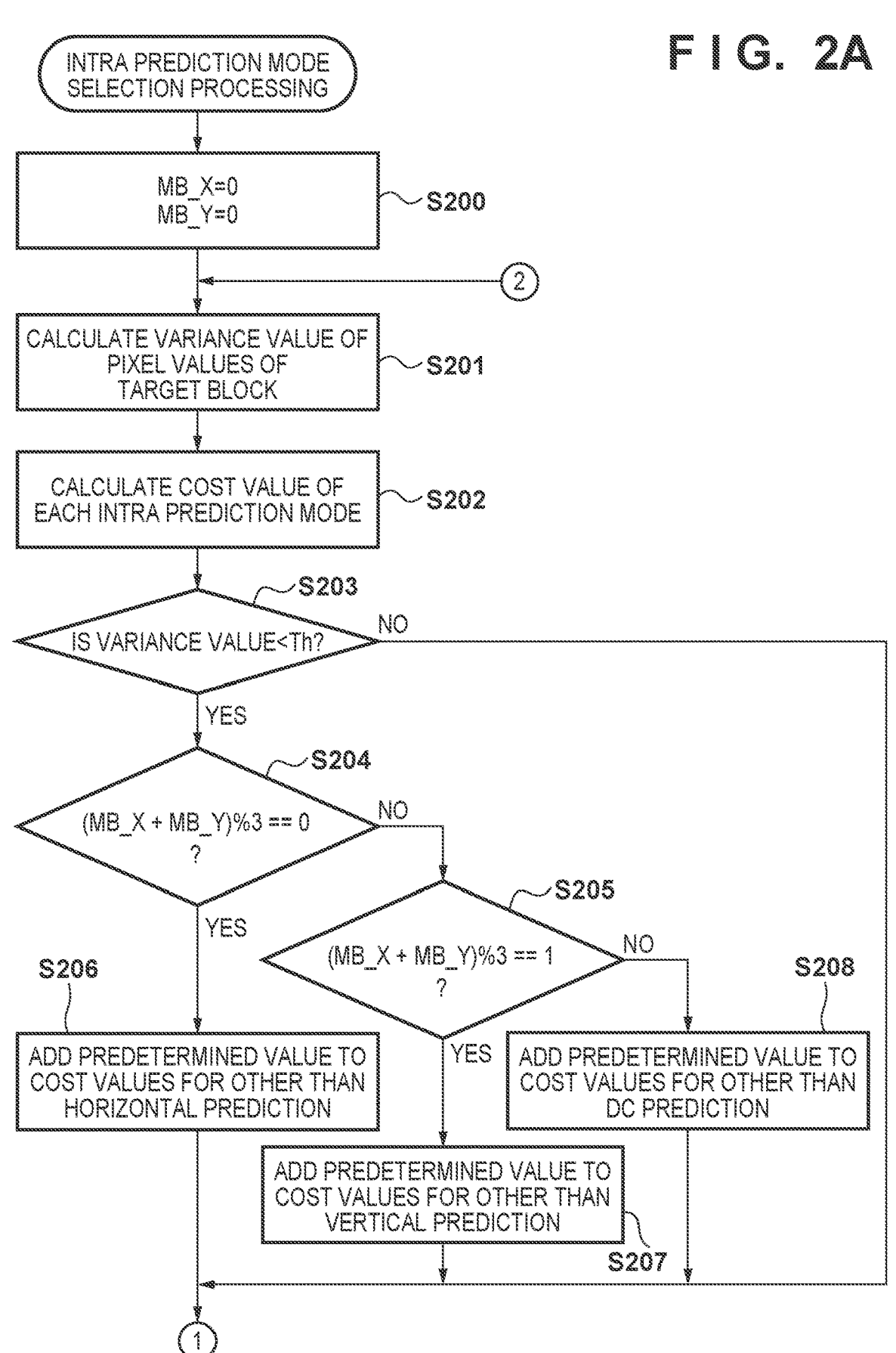

F I G. 2B
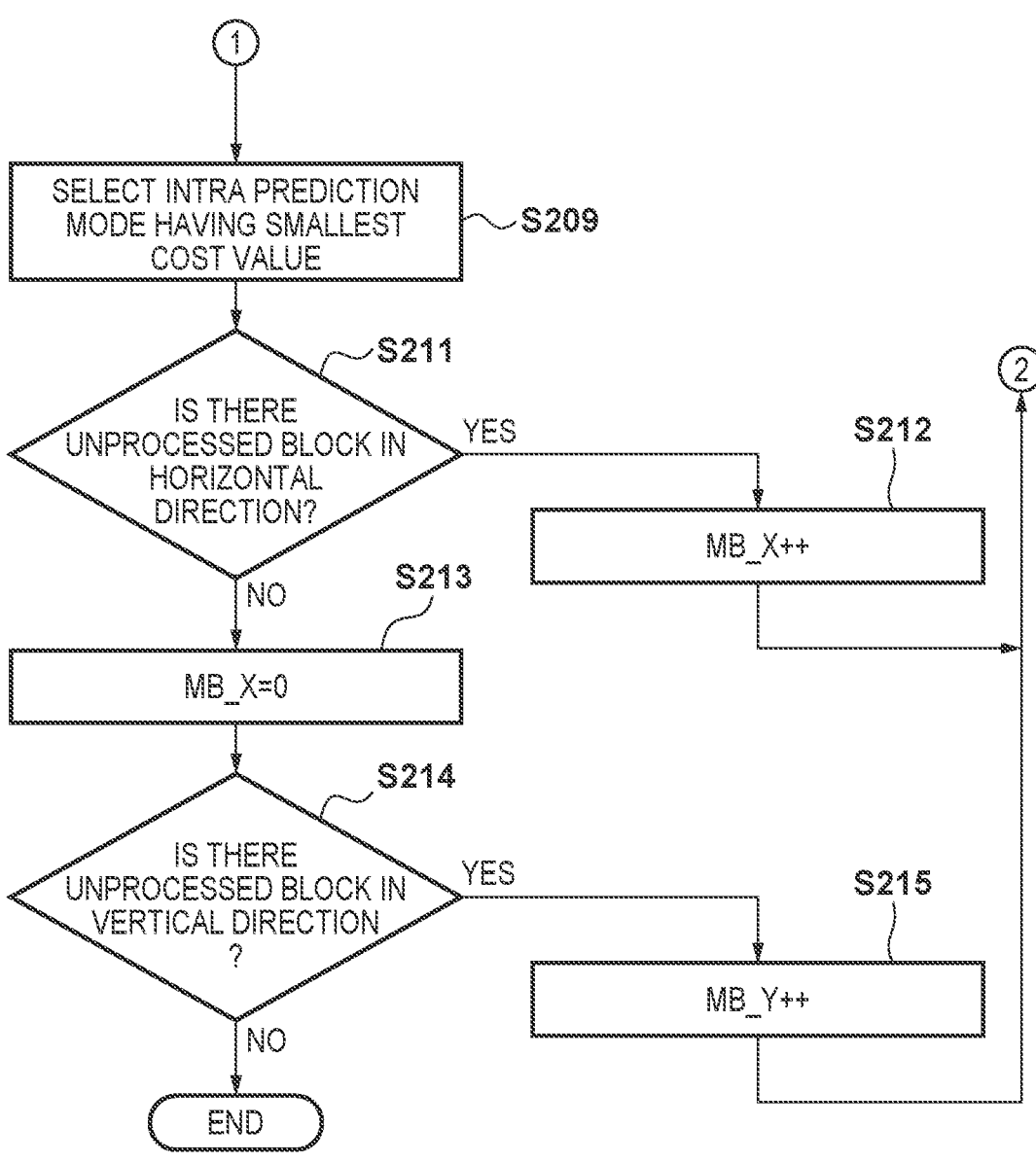

COMPLEX REGION

FLAT REGION

F I G. 7
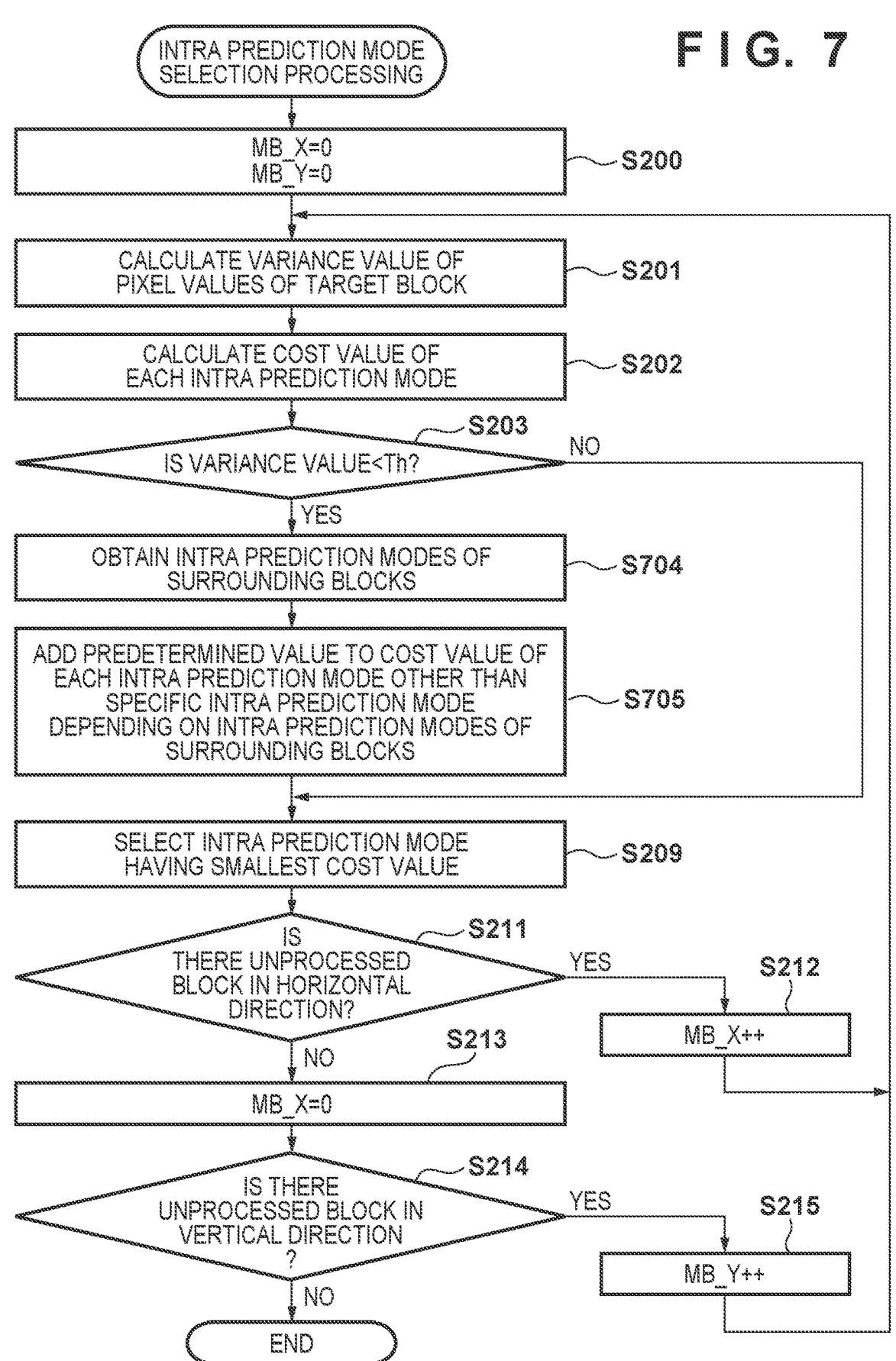

ENCODING APPARATUS, IMAGE CAPTURING APPARATUS, CONTROL METHOD, AND STORAGE MEDIUM

BACKGROUND OF THE INVENTION

Field of the Invention

The present invention relates to an encoding apparatus, an image capturing apparatus, a control method, and a storage medium.

Description of the Related Art

In recent years, a high-efficiency encoding method, such as H.265 (ITU-T: "SERIES H: AUDIOVISUAL AND MULTIMEDIA SYSTEMS Infrastructure of audiovisual services-Coding of moving video", High efficiency video coding Recommendation ITU-T H.265, 06/2019), has been used in digital cameras and digital camcorders.

H.265 defines 35 types of prediction methods for intra predictive encoding. These prediction methods are called intra prediction modes. These intra prediction modes include planar prediction that is effective in gradation regions, and DC prediction that uses an average value of surrounding reference pixels as a predicted value. The rest of the intra prediction modes is called directional prediction, in which 33 directions are defined. According to H.265, one intra prediction mode can be selected per prediction unit (PU). In the following description, a region in an image that acts as a unit of selection of an intra prediction mode, such as a PU, will be referred to as a block.

Conventional techniques have a possibility of causing deterioration in the image quality in a flat region (a region with small fluctuations in pixel values) of an image to which intra predictive encoding is applied.

The following describes an example of deterioration in the image quality in a flat region with reference to FIG. 5 and FIG. 6. FIG. 5 shows an example of an image to which intra predictive encoding is applied. In FIG. 5, a region with a diagonal lattice pattern represents a complex region (a region with large fluctuations in pixel values), and a white region represents a flat region. FIG. 6 is an enlarged view of a part of the image shown in FIG. 5. In FIG. 6, 12 blocks and 5 blocks are arrayed in the horizontal direction and the vertical direction, respectively, and there are 60 blocks in total.

In FIG. 6, a boundary block is a block that is located on a boundary between the flat region and the complex region. In the boundary block, a relatively large encoding error tends to occur. Assume a case where DC prediction has been selected as the intra prediction mode with respect to 9 flat blocks located on the right of the boundary block in the foregoing situation. According to DC prediction, prediction is performed using pixels that are left-side neighbors of (pixels in a block that is a left-side neighbor of) an encoding target block, and pixels that are upper neighbors of (pixels in a block that is an upper neighbor of) the encoding target block. Therefore, in DC prediction of a block 601, pixels in a left-side neighbor block (a boundary block) that accompanies a relatively large encoding error are used; consequently, the encoding error of the boundary block is propagated to the block 601. Furthermore, DC prediction of a block 602 uses pixels in the block 601, which accompanies the encoding error propagated from the boundary block; consequently, the encoding error of the boundary block is also propagated to the block 602 via the block 601. As propagation of the encoding error to a right-side neighbor block is repeated in this way, the encoding error of the boundary block is propagated continuously in the rightward direction. If the continuous propagation of the encoding error in a certain direction occurs in the flat region, the encoding error becomes easy for a user to see, and leads to deterioration in the image quality. Conventionally, a technique to suppress such deterioration in the image quality has not been known.

SUMMARY OF THE INVENTION

The present invention has been made in view of the foregoing situation, and provides a technique to select an intra prediction mode so as to suppress deterioration in the image quality in a flat region of an image to which intra predictive encoding is applied.

According to a first aspect of the present invention, there is provided an encoding apparatus comprising at least one processor and/or at least one circuit which functions as: a determination unit configured to determine whether a degree of flatness of pixel values in a first block among a plurality of blocks that compose an image exceeds a predetermined criterion; a selection unit configured to execute processing for selection of an intra prediction mode for the first block; a control unit configured to, in a case where it has been determined that the degree of flatness in the first block exceeds the predetermined criterion, control the processing for selection so as to increase a possibility that the intra prediction mode for the first block is different from each of one or more intra prediction modes for respective one or more reference blocks, the one or more reference blocks being one or more blocks, among the plurality of blocks, including a pixel that is referred to for intra predictive encoding of the first block in accordance with the intra prediction mode for the first block; and an encoding unit configured to apply intra predictive encoding to the first block in accordance with the intra prediction mode selected through the processing for selection.

According to a second aspect of the present invention, there is provided an image capturing apparatus, comprising: the encoding apparatus according to the first aspect, wherein the at least one processor and/or the at least one circuit further functions as an image capturing unit configured to generate the image.

According to a third aspect of the present invention, there is provided a control method executed by an encoding apparatus, comprising: determining whether a degree of flatness of pixel values in a first block among a plurality of blocks that compose an image exceeds a predetermined criterion; executing processing for selection of an intra prediction mode for the first block; in a case where it has been determined that the degree of flatness in the first block exceeds the predetermined criterion, controlling the processing for selection so as to increase a possibility that the intra prediction mode for the first block is different from each of one or more intra prediction modes for respective one or more reference blocks, the one or more reference blocks being one or more blocks, among the plurality of blocks, including a pixel that is referred to for intra predictive encoding of the first block in accordance with the intra prediction mode for the first block; and applying intra predictive encoding to the first block in accordance with the intra prediction mode selected through the processing for selection.

According to a fourth aspect of the present invention, there is provided a non-transitory computer-readable storage medium which stores a program for causing a computer to execute a control method comprising: determining whether a degree of flatness of pixel values in a first block among a plurality of blocks that compose an image exceeds a predetermined criterion; executing processing for selection of an intra prediction mode for the first block; in a case where it has been determined that the degree of flatness in the first block exceeds the predetermined criterion, controlling the processing for selection so as to increase a possibility that the intra prediction mode for the first block is different from each of one or more intra prediction modes for respective one or more reference blocks, the one or more reference blocks being one or more blocks, among the plurality of blocks, including a pixel that is referred to for intra predictive encoding of the first block in accordance with the intra prediction mode for the first block; and applying intra predictive encoding to the first block in accordance with the intra prediction mode selected through the processing for selection.

Further features of the present invention will become apparent from the following description of exemplary embodiments with reference to the attached drawings.

BRIEF DESCRIPTION OF THE DRAWINGS

FIG. 1 is a block diagram showing an exemplary configuration of an image capturing apparatus that has functions of an encoding apparatus.

FIGS. 2A and 2B are flowcharts of processing for selecting an intra prediction mode according to a first embodiment.

FIG. 7 is a flowchart of processing for selecting an intra prediction mode according to a second embodiment.

DESCRIPTION OF THE EMBODIMENTS

Figure 3:
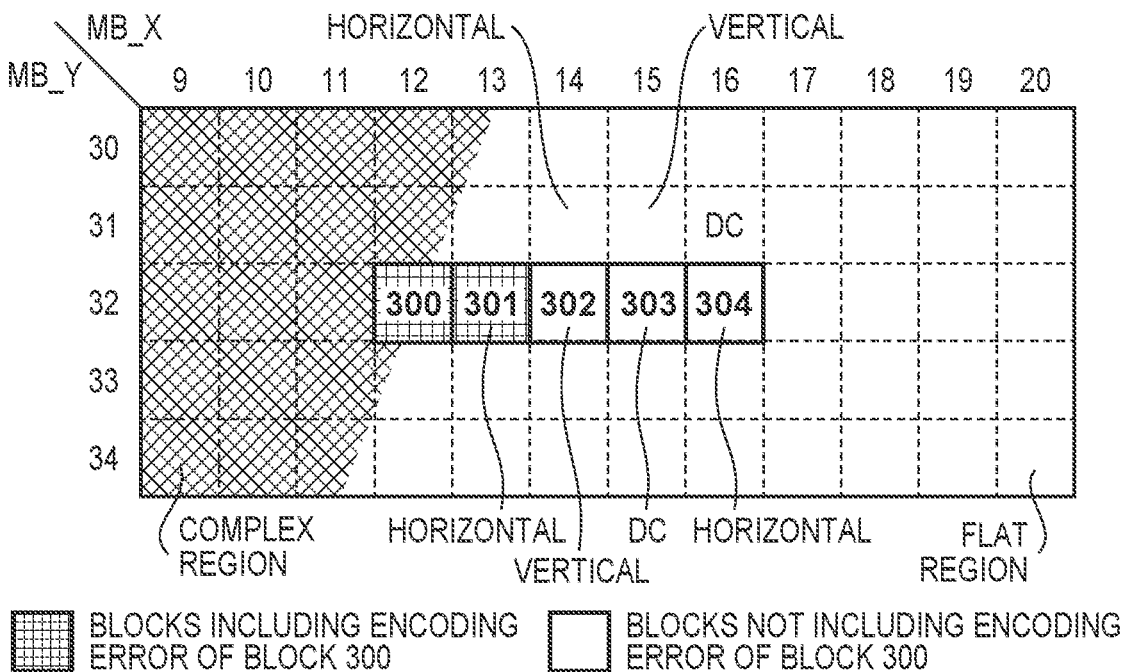
FIG. 3 is an enlarged view of a part of a certain source image.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

First Embodiment

Configuration of Image Capturing Apparatus

FIG. 1 is a block diagram showing an exemplary configuration of an image capturing apparatus that has functions of an encoding apparatus. The image capturing apparatus of FIG. 1 includes an encoding processing unit 100, an image capturing unit 101, a recording medium 116, and a control unit 117.

The encoding processing unit 100 includes an adder 102, an orthogonal transformation unit 103, a quantization unit 104, an entropy encoding unit 105, an inverse quantization unit 106, an inverse orthogonal transformation unit 107, an adder 108, an intra memory 109, an intra prediction unit 110, and a flat determination unit 111. Also, the encoding processing unit 100 includes a loop filter 112, a frame memory 113, an inter prediction unit 114, and a selector 115.

In the following description, it is assumed that the encoding processing unit 100 performs image encoding in accordance with H.265. However, in the present embodiment, an encoding method of the encoding processing unit 100 is not limited to H.265. Any encoding method that can execute intra predictive encoding in accordance with an intra prediction mode selected in units of blocks, such as PUs, can be used as the encoding method of the encoding processing unit 100.

The control unit 117 performs overall control of the image capturing apparatus, and also controls each constituent element of the image capturing apparatus, such as the encoding processing unit 100, as necessary.

The image capturing unit 101 includes a lens optical system and an image sensor that converts optical information from the lens optical system into electrical signals. The image capturing unit 101 converts the electrical signals obtained by the image sensor into digital signals, thereby generating image data. Then, development processing is executed with respect to the generated image data; as a result, an input image for the encoding processing unit 100 (a source image that is the target of encoding processing) is generated. The lens optical system can perform optical zooming, and includes an optical lens, a diaphragm, a focus control unit, and a lens driving unit. Also, no particular restriction is placed on the configuration of the image sensor; for example, the image sensor is made up of an image sensor like a CCD image sensor, a CMOS sensor, or the like. Furthermore, the development processing includes demosaicing processing, noise removal processing, optical distortion correction processing, color correction processing, and so forth.

The adder 102 generates a difference image between the source image input by the image capturing unit 101 and a predicted image output from the selector 115, which will be described later. The predicted image is generated by the intra prediction unit 110 or the inter prediction unit 114.

The orthogonal transformation unit 103 applies orthogonal transformation to data of the difference image generated by the adder 102. Specifically, for example, discrete cosine transform (DCT transform) and discrete sine transform (DST transform) are applied.

The quantization unit 104 executes quantization processing with respect to a transform coefficient that has been generated by the orthogonal transformation unit 103 through the orthogonal transformation. The quantization processing is processing for reducing mainly information of the transform coefficient concerning high frequency components; as a result, the amount of information is compressed.

The entropy encoding unit 105 receives, as inputs, the transform coefficient to which the quantization processing has been applied by the quantization unit 104, and an encoding parameter (e.g., a motion vector or the like) generated in the course of encoding in accordance with a prediction mode, and performs entropy encoding in a procedure prescribed by the H.265 standard.

The inverse quantization unit 106 executes inverse quantization processing with respect to the transform coefficient quantized by the quantization unit 104.

The inverse orthogonal transformation unit 107 applies inverse orthogonal transformation to the transform coefficient that has been inverse-quantized by the inverse quantization unit 106, thereby generating a difference image.

The adder 108 generates a locally decoded image by adding the difference image generated by the inverse orthogonal transformation unit 107 and a predicted image output from the selector 115.

The intra memory 109 is a memory that holds a locally decoded image corresponding to a region that has a possibility of being referred to for intra prediction.

The intra prediction unit 110 selects an intra prediction mode while using the source image and a surrounding image of a current block (an encoding target block) from the intra memory 109 as inputs. When selecting an intra prediction mode, the intra prediction unit 110 calculates a cost value using a cost equation for each of the plurality of selectable intra prediction modes that have been predetermined, and selects an intra prediction mode with the smallest cost value. The details of processing for selecting an intra prediction mode using the cost equation will be described later. The intra prediction unit 110 generates a predicted image in accordance with the selected intra prediction mode, and outputs the predicted image to the selector 115.

The flat determination unit 111 determines whether the target block is a flat block by determining whether a degree of flatness of pixel values in the target block exceeds a predetermined criterion. A variance value of pixel values in the target block can be used as an example of the degree of flatness of pixel values in the target block. In this case, the flat determination unit 111 calculates a variance value of pixel values in the target block, and can determine that the degree of flatness exceeds the predetermined criterion (i.e., the target block is a flat block) if the variance value is smaller than a predetermined threshold. The flat determination unit 111 outputs information indicating the determination result to the intra prediction unit 110.

The loop filter 112 removes block noise by applying filter processing to the locally decoded image. This can improve the image quality of the locally decoded image, which is used as a reference image. The locally decoded image after the filter processing is output to the frame memory 113.

The frame memory 113 is a memory that stores the locally decoded image after the filter processing executed by the loop filter 112. The frame memory 113 has a larger storage capacity than the intra memory 109, and stores a plurality of frames. The stored locally decoded image is used as a reference image at the time of inter prediction.

The inter prediction unit 114 performs inter prediction while using the source image and the reference image from the frame memory 113 as inputs. The inter prediction unit 114 is composed of a motion vector detection unit that detects a motion vector, a compensation unit that generates a predicted image using the motion vector detected by the motion vector detection unit, and so forth.

The selector 115 selects the predicted image resulting from intra prediction or the predicted image resulting from inter prediction.

The recording medium 116 is a recording medium composed of, for example, a nonvolatile memory.

Cost Equation Used in Selection of Intra Prediction Mode

In order to select an intra prediction mode, the intra prediction unit 110 calculates, with respect to the target block, an index value indicating the encoding efficiency for each of the plurality of selectable intra prediction modes. Below, it is assumed that a cost value is used as an example of the index value, and the intra prediction unit 110 calculates the cost value using a cost equation for each of the plurality of selectable intra prediction modes. For example, the following equation 1 is used as the cost equation.

$$\mathrm{cost} = \mathrm{RESIDUAL} * \alpha + CODELEN * \beta \qquad (1)$$

In equation 1, RESIDUAL is the difference between the source image and the predicted image (a residual signal), and is a variable related to the image quality and the amount of codes of the residual signal. $\alpha$ is a weight by which RESIDUAL is multiplied, and is determined while taking, for example, the value of a quantization parameter into account. $\alpha$ is set by the control unit 117 via a register or the like. CODELEN is a variable indicating the amount of codes of an intra prediction mode. $\beta$ is a weight by which CODELEN is multiplied, and is set by the control unit 117 via a register or the like, similarly to $\alpha$.

It is considered that the image quality is favorable if the difference between the source image and the predicted image is small. Therefore, for example, the sum of squared differences (SSD) (a squared error), the sum of absolute differences (SAD), the sum of absolute transformed differences (SATD) (the result of applying the Hadamard transform or the like to prediction errors and calculating the sum of absolute values thereof), or the like is used as RESIDUAL.

For example, the amount of codes after the entropy encoding, the amount of binary codes before the entropy encoding, or the like is used as CODELEN. As the accurate amount of codes is unknown until encoding is actually performed, the amount of codes is determined by looking up a table(s) in some configurations.

On a per-block basis, the intra prediction unit 110 calculates the cost values respectively for all of the selectable intra prediction modes in accordance with equation 1, and selects an intra prediction mode with the lowest cost value (an intra prediction mode corresponding to the index value indicating the highest encoding efficiency). The intra prediction unit 110 generates a predicted image by performing intra predictive encoding in accordance with the selected intra prediction mode on a per-block basis, and outputs the predicted image to the selector 115.

Processing for Selecting Intra Prediction Mode

FIGS. 2A and 2B are flowcharts of processing for selecting an intra prediction mode according to the first embodiment. This selection processing is executed by (a constituent element included in) the encoding processing unit 100 under control of the control unit 117.

In step S200, the control unit 117 sets the values of MB_X and MB_Y to 0. MB_X and MB_Y are variables for designating a current block (a target block) among the plurality of blocks that compose the source image. Each block has a size of, for example, 16 pixels horizontally×16 pixels vertically. MB_X indicates the position of the target block in the horizontal direction, and MB_Y indicates the position of the target block in the vertical direction. In other words, among the plurality of blocks arranged in a matrix, the target block is located at column MB_X, row MB_Y (column X, row Y). In the case of the uppermost and leftmost block in the source image, MB_X=MB_Y=0.

In step S201, the flat determination unit 111 calculates a variance value of pixel values in the target block so as to use the variance value in determination of the degree of flatness of the target block.

In step S202, the intra prediction unit 110 calculates the cost values respectively for all of the selectable intra prediction modes using the aforementioned cost equation of equation 1.

In step S203, the flat determination unit 111 determines whether the variance value calculated in step S201 is smaller than a predetermined threshold Th. The variance value of pixel values in the target block is an example of the degree of flatness of pixel values in the target block; when the variance value is smaller than the threshold Th, it means that the degree of flatness exceeds a predetermined criterion (i.e., the target block is a flat block). In a case where the variance value is smaller than the threshold Th, processing proceeds to step S204; otherwise, processing proceeds to step S209.

In step S204, the control unit 117 determines whether a remainder of division of (MB_X+MB_Y) by 3 is 0. In a case where the remainder is 0, processing proceeds to step S206; otherwise, processing proceeds to step S205.

In step S205, the control unit 117 determines whether the remainder of division of (MB_X+MB_Y) by 3 is 1. In a case where the remainder is 1, processing proceeds to step S207; otherwise (i.e., in a case where the remainder is 2), processing proceeds to step S208.

In step S206, the intra prediction unit 110 adds a predetermined value a to the cost values of the respective intra prediction modes other than horizontal prediction (an intra prediction mode that refers to pixels in a left-side neighbor block) among the cost values of all of the intra prediction modes calculated in step S202. In other words, the intra prediction unit 110 adjusts the index values of the respective intra prediction modes other than horizontal prediction (an intra prediction mode different from each of the one or more intra prediction modes for respective one or more reference blocks) among the plurality of selectable intra prediction modes, so as to reduce the encoding efficiencies indicated by these index values. The cost value of an intra prediction mode to which the predetermined value a is added has the same value as the cost value calculated by the following equation 2 in place of equation 1. The predetermined value a is, for example, provided from the control unit 117 to the intra prediction unit 110. Note that "one or more reference blocks" denote one or more blocks including pixels that are referred to for intra predictive encoding of the target block in accordance with the intra prediction mode for the target block among the plurality of blocks that compose the source image.

$$cost = RESIDUAL * \alpha + CODELEN * \beta + a \qquad (2)$$

In this way, as the predetermined value a is added to the cost values of the respective intra prediction modes other than horizontal prediction in step S206, the cost value of the intra prediction mode corresponding to horizontal prediction easily becomes smaller than the cost values of other intra prediction modes. This increases the possibility that horizontal prediction is selected as the intra prediction mode.

Note that although the above has described a configuration in which the predetermined value a is added in order to increase the cost values of a part of the intra prediction modes (each intra prediction mode other than horizontal prediction in step S206), a method of increasing the cost values is not limited to this. For example, the cost values may be increased by increasing at least one of the weights $\alpha$ and $\beta$ in equation 1. In this regard, the same goes for steps S207 and S208, which will be described below.

In step S207, the intra prediction unit 110 adds the predetermined value a to the cost values of the respective intra prediction modes other than vertical prediction (an intra prediction mode that refers to pixels in an upper neighbor block) among the cost values of all of the intra prediction modes calculated in step S202. Similarly to step S206, the cost equation that reflects the addition is equation 2. As a result, the cost value of the intra prediction mode corresponding to vertical prediction easily becomes smaller than the cost values of other intra prediction modes, thereby increasing the possibility that vertical prediction is selected as the intra prediction mode.

In step S208, the intra prediction unit 110 adds the predetermined value a to the cost values of the respective intra prediction modes other than DC prediction (an intra prediction mode that refers to pixels in a left-side neighbor block and pixels in an upper neighbor block) among the cost values of all of the intra prediction modes calculated in step S202. Similarly to step S206, the cost equation that reflects the addition is equation 2. As a result, the cost value of the intra prediction mode corresponding to DC prediction easily becomes smaller than the cost values of other intra prediction modes, thereby increasing the possibility that DC prediction is selected as the intra prediction mode.

In step S209, the intra prediction unit 110 selects, from among all of the selectable intra prediction modes, the intra prediction mode with the smallest cost value as the intra prediction mode for the target block. In a case where the target block is a flat block, as the cost values of intra prediction modes other than a specific intra prediction mode (horizontal prediction, vertical prediction, or DC prediction) have been increased in one of steps S206 to S208, there is a high possibility that this specific intra prediction mode (an intra prediction mode different from each of the one or more intra prediction modes for respective one or more reference blocks) is selected.

In step S211, the control unit 117 determines whether there is an unprocessed block in the horizontal direction. In a case where there is an unprocessed block in the horizontal direction, processing proceeds to step S212; otherwise, processing proceeds to step S213.

In step S212, the control unit 117 increments MB_X, and processing returns to step S201. As a result, a block that is a right-side neighbor of the current target block is selected as the next target block, and processing for selecting an intra prediction mode is executed with respect to the next target block.

In step S213, the control unit 117 sets the value of MB_X to 0.

In step S214, the control unit 117 determines whether there is an unprocessed block in the vertical direction. In a case where there is an unprocessed block in the vertical direction, processing proceeds to step S215; otherwise, processing of the present flowchart ends.

In step S215, the control unit 117 increments MB_Y, and processing returns to step S201. As a result, the leftmost block in a row below the current target block is selected as the next target block, and processing for selecting an intra prediction mode is executed with respect to the next target block.

Specific Example of Processing for Selecting Intra Prediction Mode

FIG. 3 is an enlarged view of a part of a certain source image. In FIG. 3, a region with a diagonal lattice pattern represents a complex region, and a white region represents a flat region. There are 12 squares arrayed in the horizontal direction, and 5 squares arrayed in the vertical direction; these squares represent blocks that include 16 pixels×16 pixels, and an intra prediction mode is selected on a per-block basis. In the range of the enlarged view of FIG. 3, 60 blocks are arranged in a matrix. The numbers shown above the image indicate values of MB_X, and the numbers shown to the left of the image indicate the values of MB_Y. A block 300 is a block that is located on a boundary between the flat region and the complex region (a boundary block), and a relatively large encoding error has occurred therein.

A description is now given of the selection processing of FIGS. 2A and 2B, starting from the time of MB_X=13 and MB_Y=32 upon completion of intra predictive encoding for the block 300. At this time, the target block is a block 301.

The variance value of pixel values in the block 301 is calculated in step S201, and the cost values of the respective selectable intra prediction modes are calculated in step S202. As the block 301 is a flat block, processing proceeds from step S203 to step S204.

Regarding the block 301, MB_X=13 and MB_Y=32. Therefore, as the value of MB_X+MB_Y is 45 and the remainder of division of 45 by 3 is 0, processing proceeds from step S204 to step S206, and the predetermined value a is added to the cost value of each intra prediction mode other than horizontal prediction.

In the case of a flat block, the cost values of the 35 types of intra prediction modes prescribed by H.265 have substantially the same value. However, as the predetermined value has been added to the cost values of the intra prediction modes other than horizontal prediction in step S206, there is a high possibility that the cost value of the intra prediction mode corresponding to horizontal prediction is the smallest. As a result, there is a high possibility that horizontal prediction is selected from among the 35 types of selectable intra prediction modes in step S209.

In a case where horizontal prediction has been selected as the intra prediction mode for the block 301, a predicted image is generated using the left-side neighbor pixels as reference pixels. Therefore, the encoding error that occurred in the block 300 is propagated to the block 301.

As there is an unprocessed block in the horizontal direction, processing proceeds from step S211 to step S212, and MB_X is incremented, thereby making a block 302 the next target block. Thereafter, processing returns to step S201.

The variance value of pixel values in the block 302 is calculated in step S201, and the cost values of the respective selectable intra prediction modes are calculated in step S202. As the block 302 is a flat block, processing proceeds from step S203 to step S204.

Regarding the block 302, as MB_X+MB_Y is 46, the remainder of division of MB_X+MB_Y by 3 is 1. Therefore, processing proceeds from step S204 to step S207 via step S205. This increases the possibility that vertical prediction is selected as the intra prediction mode for the block 302.

In a case where vertical prediction has been selected as the intra prediction mode for the block 302, a predicted image is generated using the upper neighbor pixels as reference pixels. Therefore, propagation of the encoding error from the block 301 to the block 302 does not occur, and the block 302 does not include the encoding error that occurred in the block 300.

Thereafter, a block 303 is set as the target block, and similar processing is executed therefor. Regarding the block 303, as the remainder of division of MB_X+MB_Y by 3 is 2, processing of step S208 is executed. This increases the possibility that DC prediction is selected as the intra prediction mode for the block 303.

In a case where DC prediction has been selected as the intra prediction mode for the block 303, the upper neighbor pixels and the left-side neighbor pixels are used as reference pixels. Therefore, the encoding error of the block 302 is propagated to the block 303. However, as the block 302 does not include the encoding error that occurred in the block 300, the block 303 does not include the encoding error that occurred in the block 300, either.

As described above, when focusing on propagation of the encoding error that occurred in the block 300 in the horizontal direction, the encoding error is propagated only through to the block 301 (the propagation stops in the block 301). That is to say, in the flat region, the propagation of the encoding error in the horizontal direction does not last long. This makes it difficult for a user to visually recognize the encoding error, thereby suppressing deterioration in the image quality.

The processing for selecting an intra prediction mode is executed similarly with respect to other blocks as well. Therefore, for example, there is a high possibility that horizontal prediction is selected for a block 304, and there is a high possibility that horizontal prediction is selected for a block that is an upper neighbor of the block 302. Furthermore, there is a high possibility that vertical prediction is selected for a block that is an upper neighbor of the block 303, and there is a high possibility that DC prediction is selected for a block that is an upper neighbor of the block 304.

Next, a specific example of the processing for selecting an intra prediction mode will be described with a focus on propagation of the encoding error in the vertical direction.

Figure 4:
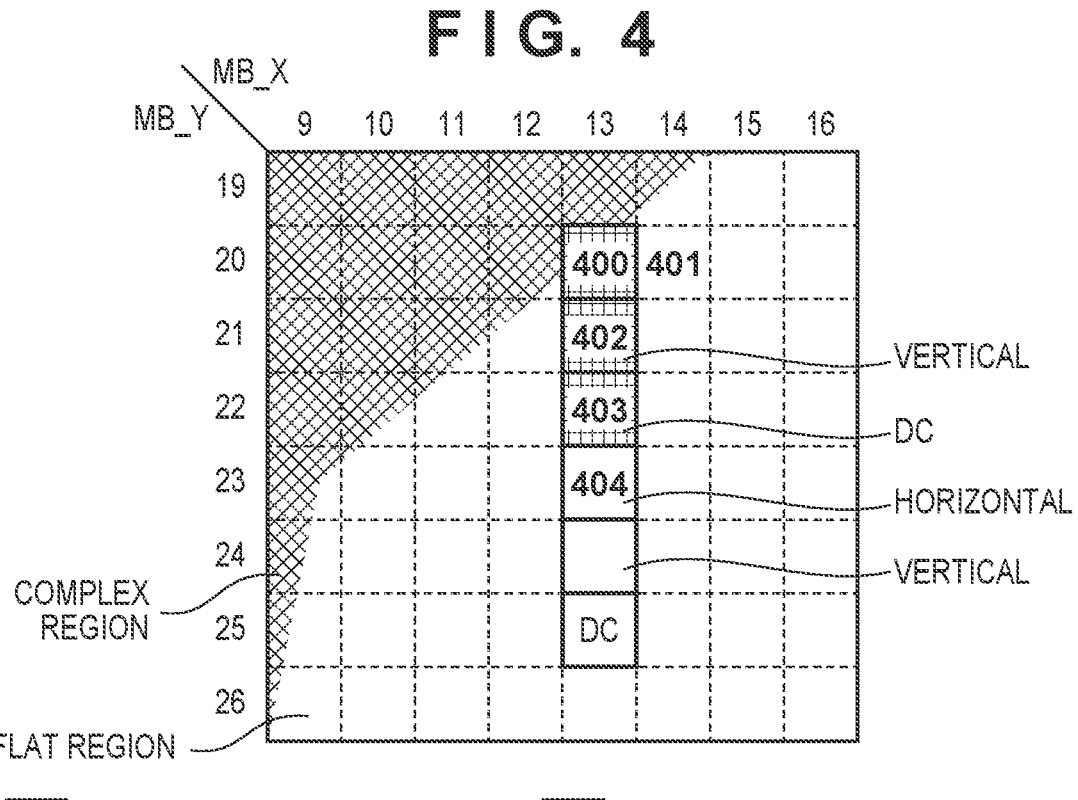
FIG. 4 is an enlarged view of a part of a certain source image.
Figure 5:
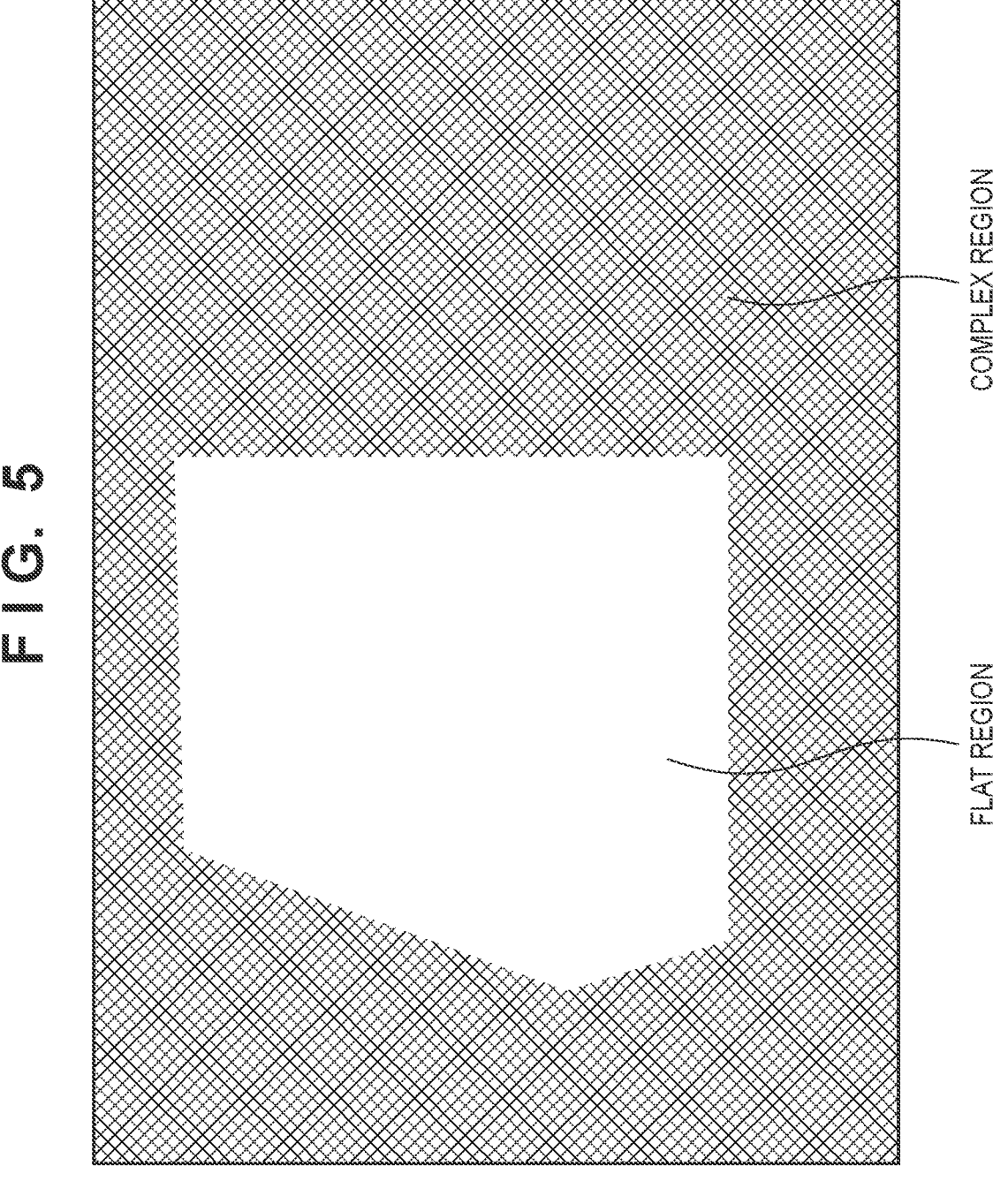
FIG. 5 is a diagram showing an example of an image to which intra predictive encoding is applied.
Figure 6:
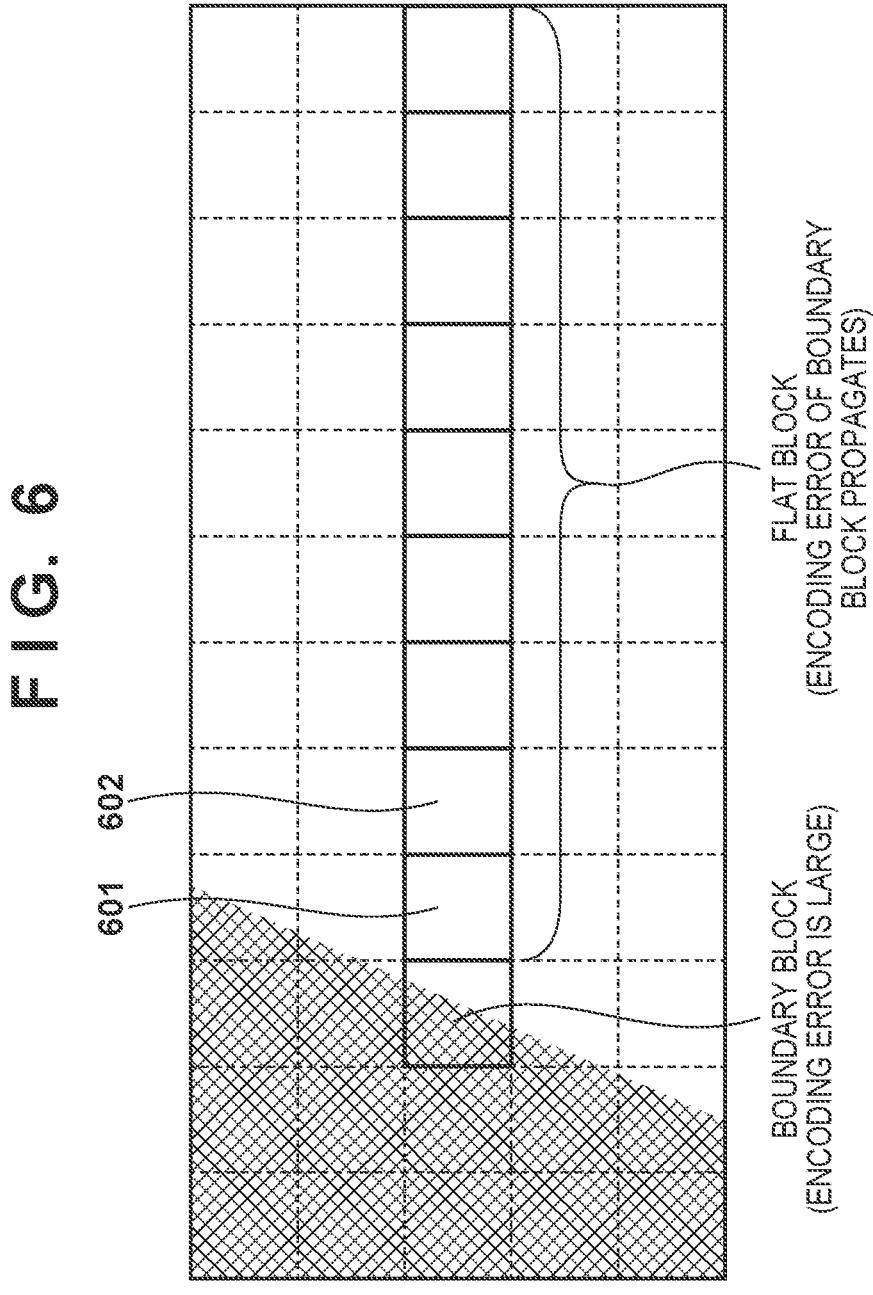
FIG. 6 is an enlarged view of a part of the image shown in FIG. 5.

FIG. 4 is an enlarged view of a part of a certain source image. In FIG. 4, a region with a diagonal lattice pattern represents a complex region, and a white region represents a flat region. There are 8 squares arrayed in the horizontal direction, and 8 squares arrayed in the vertical direction; these squares represent blocks that include 16 pixels×16 pixels, and an intra prediction mode is selected on a per-block basis. In the range of the enlarged view of FIG. 4, 64 blocks are arranged in a matrix. The numbers shown above the image indicate values of MB_X, and the numbers shown to the left of the image indicate the values of MB_Y. A block 400 is a block that is located on a boundary between the flat region and the complex region (a boundary block), and a relatively large encoding error has occurred therein.

A description is now given of the selection processing of FIGS. 2A and 2B, starting from the time of MB_X=14 and MB_Y=20 upon completion of intra predictive encoding for the block 400. At this time, the target block is a block 401.

When encoding of a row of blocks of MB_Y=20, in which the block 401 exists, has been conducted in raster order, there is no unprocessed block in the horizontal direction at the right edge of the image. Therefore, processing transitions from step S211 to step S213, and the value of MB_X is set to 0. As a row of blocks of MB_Y=21 exists in the vertical direction, processing proceeds from step S214 to step S215, and MB_Y is incremented. Each block is processed in order in the rightward direction, starting from the left edge of the row of blocks of MB_Y=21 (a block of MB_X=0, MB_Y=21), and a block 402 becomes the target block.

As the block 402 is a flat block, processing proceeds from step S203 to step S204. In a case where the block 402 is the target block, MB_X=13 and MB_Y=21, and therefore MB_X+MB_Y=34. As the remainder of division of 34 by 3 is 1, processing transitions to step S207. Processing of step S207 increases the possibility that vertical prediction is selected as the intra prediction mode for the block 402.

In a case where vertical prediction has been selected as the intra prediction mode for the block 402, a predicted image is generated using the upper neighbor pixels as reference pixels. Therefore, the encoding error that occurred in the block 400 is propagated to the block 402.

Similarly, regarding a block 403, MB_X+MB_Y=35; as the remainder of division of 35 by 3 is 2, processing of step S208 is executed. This increases the possibility that DC prediction is selected as the intra prediction mode for the block 403.

In a case where DC prediction has been selected as the intra prediction mode for the block 403, the upper neighbor pixels and the left-side neighbor pixels are used as reference pixels. Therefore, the encoding error of the block 402 is propagated to the block 403. As the block 402 includes the encoding error that occurred in the block 400, the block 403 also includes the encoding error that occurred in the block 400. As a result, the encoding error that occurred in the block 400 is propagated to the block 403.

Similarly, with respect to a block 404, processing of step S206 increases the possibility that horizontal prediction is selected as the intra prediction mode for the block 404.

In a case where horizontal prediction has been selected as the intra prediction mode for the block 404, a predicted image is generated using the left-side neighbor pixels as reference pixels. Therefore, the encoding error of the block 403 is not propagated to the block 404, and the block 404 does not include the encoding error that occurred in the block 400.

As described above, when focusing on propagation of the encoding error that occurred in the block 400 in the vertical direction, the encoding error is propagated only through to the block 403 (the propagation stops in the block 403). That is to say, in the flat region, the propagation of the encoding error in the vertical direction does not last long. This makes it difficult for the user to visually recognize the encoding error, thereby suppressing deterioration in the image quality.

Summary of First Embodiment

As described above, according to the first embodiment, an image capturing apparatus that has functions of an encoding apparatus determines whether the degree of flatness of pixel values in a target block exceeds a predetermined criterion (i.e., whether the target block is a flat block). Also, the image capturing apparatus executes processing for selecting an intra prediction mode for the target block. Here, in a case where the target block is a flat block, the image capturing apparatus controls the processing for selecting an intra prediction mode for the target block based on the remainder of division of (MB_X+MB_Y) by 3. For example, the image capturing apparatus performs control to increase the possibility that horizontal prediction is selected in a case where the remainder is 0, performs control to increase the possibility that vertical prediction is selected in a case where the remainder is 1, and performs control to increase the possibility that DC prediction is selected in a case where the remainder is 2. In a case where the target block is a flat block, the foregoing control increases the possibility that the intra prediction mode for the target block is different from each of the one or more intra prediction modes for respective one or more reference blocks (one or more blocks including a pixel that is referred to for intra predictive encoding of the target block in accordance with the intra prediction mode for the target block among a plurality of blocks that compose a source image).

For example, as shown in FIG. 3, there is a high possibility that horizontal prediction is selected for a block that is an upper neighbor of the block 302, and vertical prediction is selected for the block 302. Therefore, it can be said that, when focusing on the block 302 as a target block, control is performed to increase the possibility that the intra prediction mode (vertical prediction) for the target block (block 302) is different from each of the one or more intra prediction modes (horizontal prediction) for respective one or more reference blocks (the block that is the upper neighbor of the block 302). When such control is performed, the direction of propagation of an encoding error becomes diverse, and propagation of an encoding error that has occurred in a specific block in a certain direction in a flat region does not last long.

Therefore, according to the present embodiment, deterioration in the image quality in a flat region of an image to which intra predictive encoding is applied can be suppressed.

Note that the above-described configuration of the present embodiment is merely an example of a configuration that realizes control for increasing the possibility that the intra prediction mode for the target block is different from each of the one or more intra prediction modes for respective one or more reference blocks. For example, in the above description, it is assumed that three types of intra prediction modes, namely horizontal prediction, vertical prediction, and DC prediction, are the intra prediction modes that are targets of control for increasing the possibility of selection. However, the number of types of intra prediction modes that are targets of control for increasing the possibility of selection is not limited to three. Furthermore, a part or all of these three types of intra prediction modes may be changed to other types of intra prediction modes.

Second Embodiment

A second embodiment describes an exemplary configuration different from that of the first embodiment in relation to a configuration that realizes control to increase the possibility that an intra prediction mode for a target block is different from each of the one or more intra prediction modes for respective one or more reference blocks. In the second embodiment, the basic configuration of the image capturing apparatus (FIG. 1) that has the functions of the encoding apparatus is similar to that of the first embodiment. The following mainly describes the differences from the first embodiment.

FIG. 7 is a flowchart of processing for selecting an intra prediction mode according to the second embodiment. This selection processing is executed by (a constituent element included in) the encoding processing unit 100 under control of the control unit 117.

Processing of steps S200 to S203 is similar to that of the first embodiment (FIG. 2A). However, in a case where the target block has been determined to be a flat block in step S203, processing proceeds to step S704.

In step S704, the intra prediction unit 110 obtains intra prediction modes for surrounding blocks of the target block.

Figures 8, 9:
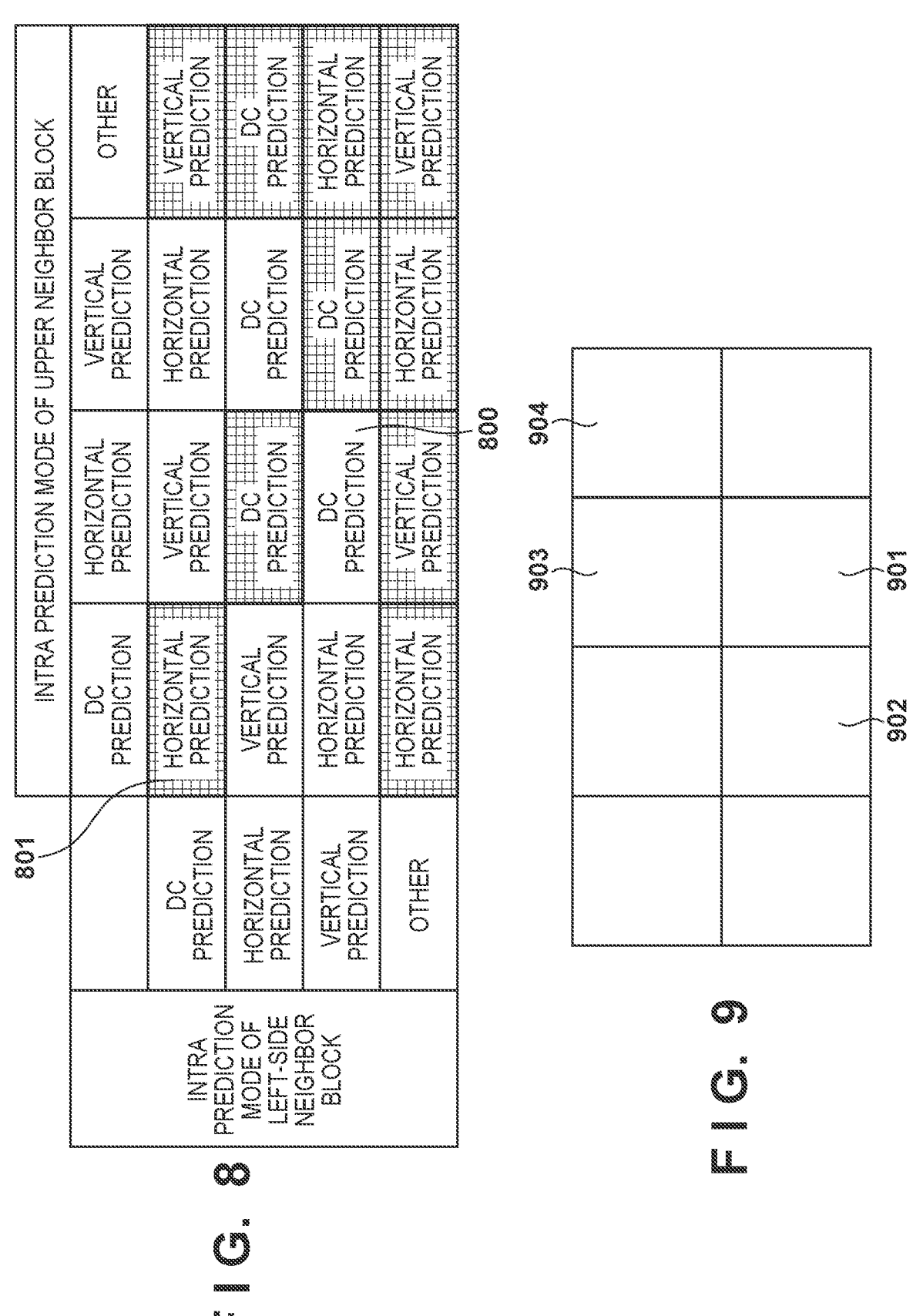
FIG. 8 is a diagram illustrating a method of determining intra prediction modes for which a predetermined value is added to cost values.
FIG. 9 is a diagram illustrating surrounding blocks of a target block.

Now, a description is given of surrounding blocks of the target block with reference to FIG. 9. Squares in FIG. 9 represent blocks, and an intra prediction mode is selected on a per-block basis. In a case where a block 901 is the target block, the intra prediction unit 110 obtains an intra prediction mode for a block 902 that is a left-side neighbor of the block 901, and an intra prediction mode for a block 903 that is an upper neighbor of the block 901.

Note, it is assumed here that the intra prediction unit 110 selects the intra prediction mode for the target block from among three types of intra prediction modes, namely horizontal prediction, vertical prediction, and DC prediction. Therefore, the left-side neighbor block and the right-side neighbor block are used as the surrounding blocks. However, the surrounding blocks can vary depending on selectable intra prediction modes. For example, in a case where an intra prediction mode that refers to pixels in an upper-right block (a block 904 in a case where the block 901 is the target block) is selectable, the surrounding blocks include the upper-right block.

In step S705, the intra prediction unit 110 adds a predetermined value to the cost values of the respective intra prediction modes other than a specific intra prediction mode that depends on the obtained intra prediction modes for the surrounding blocks. An addition method similar to the addition method that has been described in relation to the first embodiment with reference to step S206 of FIG. 2A can be used as an addition method here.

The following describes a method of determining the intra prediction modes for which the predetermined value is added to the cost values with reference to FIG. 8. A table of FIG. 8 shows a specific intra prediction mode that depends on the intra prediction mode for the block that is the upper neighbor of the target block and the intra prediction mode for the block that is the left-side neighbor thereof; the cost values of the respective intra prediction modes other than the specific intra prediction mode shown here are the targets to which the predetermined value is added.

For example, in a case where the intra prediction mode for the upper neighbor block is horizontal prediction and the intra prediction mode for the left-side neighbor block is vertical prediction, DC prediction shown in a cell 800 falls under the "specific intra prediction mode", and the predetermined value is added to the cost values of the respective intra prediction modes other than DC prediction.

In FIG. 8, each cell with a lattice-pattern background indicates that an intra prediction mode other than the intra prediction mode within the cell may be set as the "specific intra prediction mode". For example, assume a case where the intra prediction mode for the upper neighbor block is DC prediction, and the intra prediction mode for the left-side neighbor block is also DC prediction. In this case, horizontal prediction shown in a cell 801 falls under the "specific intra prediction mode", and the predetermined value is added to the cost values of the respective intra prediction modes other than horizontal prediction. However, here, vertical prediction may fall under the "specific intra prediction mode" because it is sufficient that the "specific intra prediction mode" be different from the intra prediction modes for the upper neighbor block and the left-side neighbor block. In this case, the predetermined value is added to the cost values of the respective intra prediction modes other than vertical prediction.

Processing of step S209 onward is similar to that of the first embodiment (FIG. 2B). As a result of processing of steps S704 and S705, there is a high possibility that an intra prediction mode different from the intra prediction modes for the surrounding blocks is selected as the intra prediction mode for the target block in step S209.

As described above, the second embodiment also realizes control to increase the possibility that the intra prediction mode for the target block is different from each of the one or more intra prediction modes for respective one or more reference blocks, similarly to the first embodiment. Therefore, according to the present embodiment, deterioration in the image quality in a flat region of an image to which intra predictive encoding is applied can be suppressed.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2023-045786, filed Mar. 22, 2023, which is hereby incorporated by reference herein in its entirety.

What is claimed is:

1. An encoding apparatus comprising:

at least one processor and/or at least one circuit, which functions as a plurality of units comprising:

(1) a determination unit configured to determine whether a degree of flatness of pixel values in a first block among a plurality of blocks that compose an image exceeds a predetermined criterion;

(2) a selection unit configured to execute processing for selection of an intra prediction mode for the first block;

(3) a control unit configured to, in a case where it has been determined that the degree of flatness in the first block exceeds the predetermined criterion, control the processing for selection so as to increase a possibility that the intra prediction mode for the first block is different from each of one or more intra prediction modes for respective one or more reference blocks, the one or more reference blocks being one or more blocks, among the plurality of blocks, including a pixel that is referred to for intra predictive encoding of the first block in accordance with the intra prediction mode for the first block; and (4) an encoding unit configured to apply intra predictive encoding to the first block in accordance with the intra prediction mode selected through the processing for selection, wherein the plurality of blocks are arranged in a matrix, wherein the control unit: (i) in a case where it has been determined that the degree of flatness in the first block, which is located at column X, row Y, exceeds the predetermined criterion, controls the processing for selection so as to increase a possibility that a different intra prediction mode is selected from among three types of predetermined intra prediction modes depending on a remainder of division of (X+Y) by three; or (ii) in a case where it has been determined that the degree of flatness in the first block exceeds the predetermined criterion, controls the processing for selection so as to increase a possibility that an intra prediction mode is different from an intra prediction mode for a left-side neighbor block and an intra prediction mode for an upper neighbor block is selected from among three types of predetermined intra prediction modes, and wherein the three types of predetermined intra prediction modes include (1) an intra prediction mode that refers to a pixel in a left-side neighbor block, (2) an intra prediction mode that refers to a pixel in an upper neighbor block, and (3) an intra prediction mode that refers to a pixel in a left-side neighbor block and a pixel in an upper neighbor block.

2. The encoding apparatus according to claim 1, wherein in a case where it has been determined that the degree of flatness in the first block exceeds the predetermined criterion, the control unit controls the processing for selection so as to increase a possibility that a different intra prediction mode is selected from among the three types of predetermined intra prediction modes depending on a remainder of division of (X+Y) by three.

3. The encoding apparatus according to claim 1, wherein in a case where it has been determined that the degree of flatness in the first block exceeds the predetermined criterion, the control unit controls the processing for selection so as to increase a possibility that an intra prediction mode is different from an intra prediction mode for a left-side neighbor block and an intra prediction mode for an upper neighbor block is selected from among the three types of predetermined intra prediction modes.

4. The encoding apparatus according to claim 1, wherein the processing for selection includes processing for, with respect to the first block, calculating an index value indicating an encoding efficiency for each of a plurality of predetermined intra prediction modes, and selecting an intra prediction mode corresponding to the index value indicating a highest encoding efficiency from among the plurality of predetermined intra prediction modes.

5. The encoding apparatus according to claim 4, wherein in a case where it has been determined that the degree of flatness in the first block exceeds the predetermined criterion, the control unit adjusts the index values of respective intra prediction modes other than a first intra prediction mode among the plurality of predetermined intra prediction modes so as to reduce the encoding efficiencies indicated by the index values, and wherein the first intra prediction mode is an intra prediction mode different from each of the one or more intra prediction modes for the respective one or more reference blocks.

6. The encoding apparatus according to claim 1, wherein the determination unit determines that the degree of flatness in the first block exceeds the predetermined criterion in a case where a variance value of the pixel values in the first block is smaller than a predetermined threshold.

7. An image capturing apparatus comprising:
the encoding apparatus according to claim 1,
wherein the at least one processor and/or the at least one circuit further functions as an image capturing unit configured to generate the image.

8. A control method executed by an encoding apparatus, the control method comprising:
determining whether a degree of flatness of pixel values in a first block among a plurality of blocks that compose an image exceeds a predetermined criterion;
executing processing for selection of an intra prediction mode for the first block, wherein in a case where it has been determined that the degree of flatness in the first block exceeds the predetermined criterion, the processing for selection is controlled so as to increase a possibility that the intra prediction mode for the first block is different from each of one or more intra prediction modes for respective one or more reference blocks, the one or more reference blocks being one or more blocks, among the plurality of blocks, including a pixel that is referred to for intra predictive encoding of the first block in accordance with the intra prediction mode for the first block; and
applying intra predictive encoding to the first block in accordance with the intra prediction mode selected through the processing for selection,
wherein the plurality of blocks are arranged in a matrix, wherein: (i) in a case where it has been determined that the degree of flatness in the first block, which is located at column X, row Y, exceeds the predetermined criterion, the processing for selection is controlled so as to increase a possibility that a different intra prediction mode is selected from among three types of predetermined intra prediction modes depending on a remainder of division of (X+Y) by three; or (ii) in a case where it has been determined that the degree of flatness in the first block exceeds the predetermined criterion, the processing for selection is controlled so as to increase a possibility that an intra prediction mode is different from an intra prediction mode for a left-side neighbor block and an intra prediction mode for an upper neighbor block is selected from among three types of predetermined intra prediction modes, and
wherein the three types of predetermined intra prediction modes include (1) an intra prediction mode that refers to a pixel in a left-side neighbor block, (2) an intra prediction mode that refers to a pixel in an upper neighbor block, and (3) an intra prediction mode that refers to a pixel in a left-side neighbor block and a pixel in an upper neighbor block.

9. A non-transitory computer-readable storage medium which stores a program for causing a computer to execute a control method, the control method comprising:
determining whether a degree of flatness of pixel values in a first block among a plurality of blocks that compose an image exceeds a predetermined criterion;
executing processing for selection of an intra prediction mode for the first block, wherein in a case where it has been determined that the degree of flatness in the first block exceeds the predetermined criterion, the processing for selection is controlled so as to increase a possibility that the intra prediction mode for the first block is different from each of one or more intra prediction modes for respective one or more reference blocks, the one or more reference blocks being one or more blocks, among the plurality of blocks, including a pixel that is referred to for intra predictive encoding of the first block in accordance with the intra prediction mode for the first block; and applying intra predictive encoding to the first block in accordance with the intra prediction mode selected through the processing for selection, wherein the plurality of blocks are arranged in a matrix, wherein: (i) in a case where it has been determined that the degree of flatness in the first block, which is located at column X, row Y, exceeds the predetermined criterion, the processing for selection is controlled so as to increase a possibility that a different intra prediction mode is selected from among three types of predetermined intra prediction modes depending on a remainder of division of (X+Y) by three; or (ii) in a case where it has been determined that the degree of flatness in the first block exceeds the predetermined criterion, the processing for selection is controlled so as to increase a possibility that an intra prediction mode is different from an intra prediction mode for a left-side neighbor block and an intra prediction mode for an upper neighbor block is selected from among three types of predetermined intra prediction modes, and wherein the three types of predetermined intra prediction modes include (1) an intra prediction mode that refers to a pixel in a left-side neighbor block, (2) an intra prediction mode that refers to a pixel in an upper neighbor block, and (3) an intra prediction mode that refers to a pixel in a left-side neighbor block and a pixel in an upper neighbor block.

* * * * *